United States Patent [19]

Decaux

[11] 4,249,231
[45] Feb. 3, 1981

[54] LUMINOUS EDGE LIGHTED DEVICE

[75] Inventor: Jean-Claude Decaux, Paris, France

[73] Assignee: Jean Claude Decaux Paris Publicite Abribus, France

[21] Appl. No.: 26,583

[22] Filed: Apr. 3, 1979

[30] Foreign Application Priority Data

Apr. 4, 1978 [FR] France .................................. 78 09876

[51] Int. Cl.³ ............................................... F21V 7/04
[52] U.S. Cl. ...................................... 362/31; 362/297; 362/346; 362/223
[58] Field of Search .................. 362/31, 297, 346, 223

[56] References Cited
U.S. PATENT DOCUMENTS 4,170,035  10/1979  Walker .................................... 362/31

Primary Examiner—Stephen J. Lechert, Jr.
Attorney, Agent, or Firm—Lowe, Kokjer, Kircher, Wharton & Bowman

[57] ABSTRACT

The device is adaptable for any panel of non-opaque material, whether it concerns advertisement, information panel, signboards, signposts or signalling posts or the like. The panel 1 is associated with at least one source of lighting 3 which faces one of the edges 2 of the panel. The panel carries an engraving 7 having a surface which reflects light and divides the incident beam into a series of pencils of light associated with various elements of the engraving.

8 Claims, 3 Drawing Figures

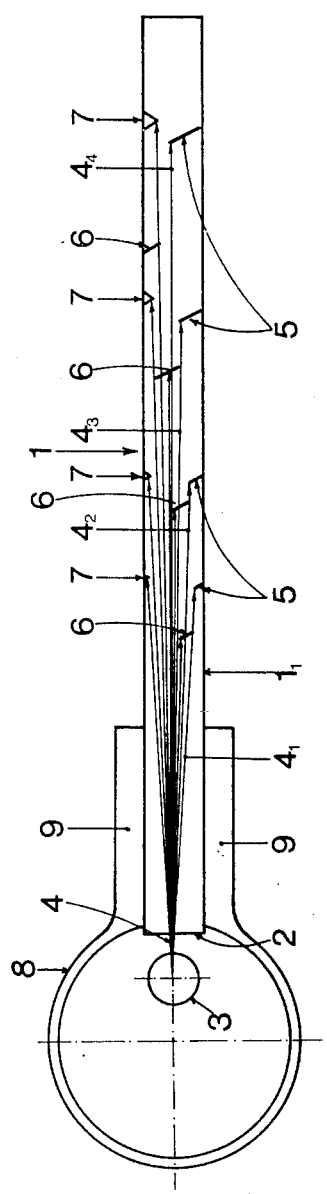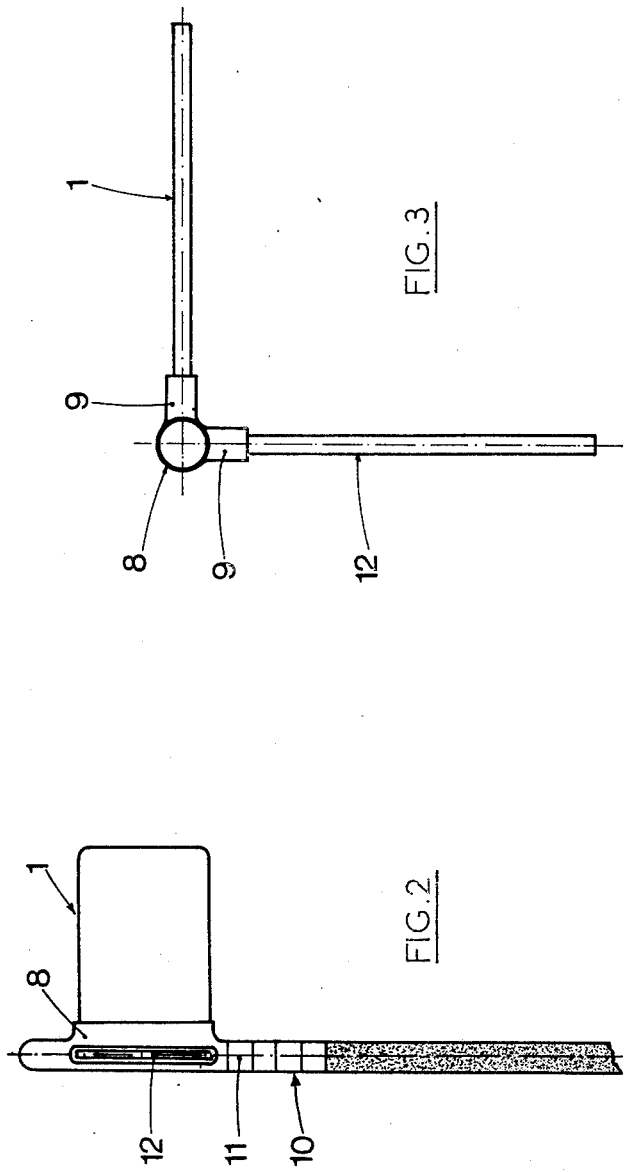

LUMINOUS EDGE LIGHTED DEVICE

The invention relates to a luminous device adaptable for any panel of non-opaque material, whether it concerns advertisement, information or sign panels, signalling posts or the like.

These advertisement or information panels are usually made from cases at least one side of which is of translucent or transparent material and in which there are placed sources of lighting, such as fluorescent tubes, which illuminate the cases from inside, so as to render visible at night the writing or markings shown on the translucent side of said cases.

These cases are expensive to make and very fragile and require at least one source of lighting per case. Further, the lighting tube is rendered vulnerable in that it has no protection since it is disposed in the case which is exposed to the exterior.

According to the invention, there is provided a luminous device comprising at least one panel of non-opaque material and acting as a support for information, an advertisement sign or signalling, this panel being associated with a source of lighting, wherein the source of lighting is located in facing relation to at least one of the edges of the panel, the luminous radiation which enters the thickness of said panel being subdivided by reflecting surfaces.

In one embodiment, the reflecting surfaces are formed by inclined elements embedded in the panel, said elements being of dimensions size measured in the direction of the thickness of the panel which increase from the end of the panel located in facing relation to the source of lighting to the opposite end thereof.

According to a feature of the invention, the reflecting surfaces are formed by cavities on at least one of the faces of the panel, said cavities being formed in particular by engravings with inclined edges the depth of which edges increases from the entrance of the luminous radiation to the exit thereof.

A luminous device is shown by way of example, to which the scope of the invention is not intended to be limited, in the accompanying drawings in which:

FIG. 1 is a diagrammatic plan view of the device according to the invention;

FIG. 2 is an elevational view of a signpost or signalling post including a luminous device according to the invention;

FIG. 3 is a plan view of the signpost shown in FIG. 2;

The luminous device according to the invention comprises a plate or panel, which is necessarily of a non-opaque material, such as a translucent or transparent material for example a plate of plexiglass.

This plate 1, which may have various sizes and shapes, has the feature of having at least one rectilinear face 2, in front of which there is fixed, in a parallel plane, a source of lighting 3 for example a flourescent tube. As seen in FIG. 1, this tube is located in the vicinity of the face 2 of the panel 1 so that the luminous radiation 4 emitted by this tube passes through the plate 1 in the direction of its length and floods it with light.

The luminous radiation is reflected by inclined reflecting surfaces the function of which is to direct by reflection the luminous radiation 4 toward at least one of the faces $1_1$ of the plate 1, and in particular that which has markings or engravings constituting the advertisement, information or documentary text carried by the plate.

These reflecting surfaces may be produced in quite different ways and the following three examples are of course not intended to be limitative of the scope of the invention.

In the first example, the reflecting surfaces 5 are formed by inclined elements of different dimensions, which are in the form of inserted strips, that is to say strips embedded in the plate of plexiglass. The luminous radiation is thus subdivided by each of these reflecting surfaces which, owing to their dimensions which increase from the entrance of the luminous radiation to the exit thereof, receive thereon a ray $4_1$, $4_2$, or $4_4$ of the luminous radiation.

In the second example, the luminous radiation 4 is subdivided into elementary rays by reflecting elements 6 which, in this case, are of the same dimension but are embedded in the thickness of the plate at different places so as to receive the rays of the luminous radiation.

In the third example, the reflecting surfaces are formed by engravings 7 having inclined edges the depth of which increases from the entrance of the luminous radiation to the exit thereof. Thus, in each case, the luminous radiation extending in the longitudinal plane of the plate, which is parallel sided in the considered example, is subdivided into elementary rays which are themselves reflected on the lateral faces of the plate by the reflecting surfaces provided for this purpose.

This system of lighting may be associated with any type of town furnishing or equipment, for example a signpost as shown in FIG. 2. In this case, the plate 1 is associated with a housing 8 of cylindrical shape extended radially by two side portions 9 between which the plate 1 is gripped, the lighting tube 3 being of course located in facing relation to the lateral face 2 of the plate. This plate and its housing are supported by a post 10, fixed preferably in the ground. This post may of course comprise a stack of spacer rings 11 which serve to fix a plurality of superimposed plates 1. In the considered example, the diameter of the housing 8 is similar to the diameter of the post 10 and this housing comprises two pairs of side portions 9 (FIG. 3) for receiving two plates 1 and 12 contained in orthogonal planes.

It will be obvious that two, three of four panels may be provided on the same housing and a plurality of housings may be carried on the same post.

The luminous device may be suitable for any other town furnishing such as fixed or moving advertisement panels, luminous sign boards, display or information panels without departing from the scope of the invention.

I claim:

1. A luminous device comprising in combination:
   at least one panel of non-opaque material having edges and faces and acting as a support for indicia conveying information;
   at least one source of lighting located behind and to the side of said indicia, said lighting source being adapted to project light in a direction parallel to said indicia; and
   a plurality of reflecting surfaces disposed directly behind said indicia in fixed relationship to the latter and in a location to intercept light from said source thereby dividing the beam of light from said source into a plurality of pencils of light which are reflected past said indicia.

2. A device as claimed in claim 1, wherein said reflecting surfaces are presented by engravings on said panel.

3. A device as claimed in claim 2, wherein said reflecting surfaces are presented by a plurality of inclined elements disposed in offset relationship.

4. A device as set forth in claim 1, wherein said panel includes a back in spaced relationship to said indicia and said reflecting surfaces are presented by inclined elements mounted on said back.

5. A device as claimed in claim 1, comprising a support housing which extends along one of the edges of the panel and supports the panel, said source of lighting being disposed within the support housing and comprising a fluorescent tube.

6. A device as claimed in claim 5, comprising a support post for fixing in the ground the support housing being fixed on the support post.

7. A device as claimed in claim 6, wherein the support housing is fixed adjacent an upper end of the support post and in the axial extension of the post.

8. A device as claimed in claim 7, wherein the support housing has a cylindrical shape and comprises at least two radially extending side portions which are in gripping and fixed relation to the panel.

* * * * *